June 23, 1931. S. G. BROWN 1,811,300
GYROSCOPIC DIRECTIONAL INSTRUMENT
Filed Dec. 22, 1926
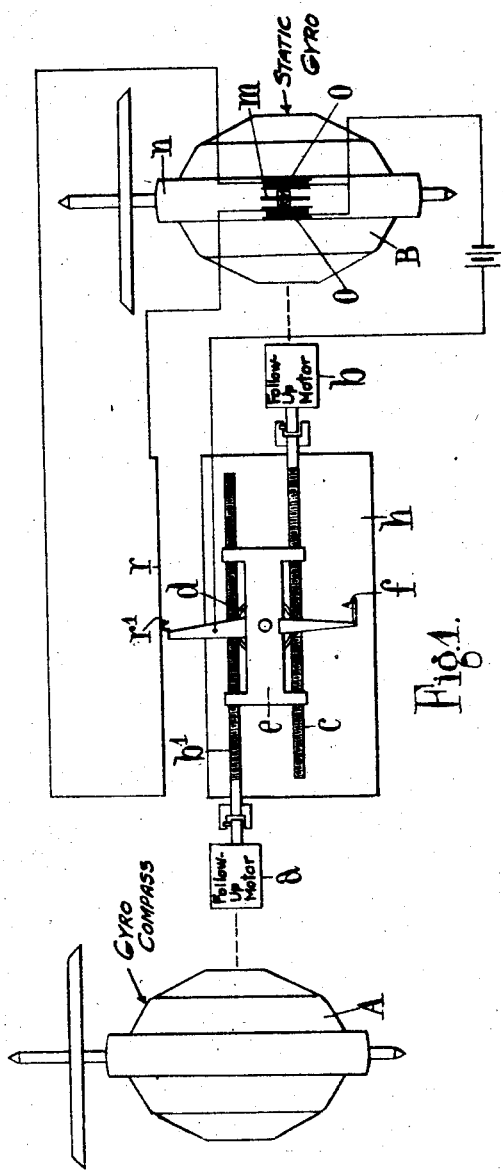
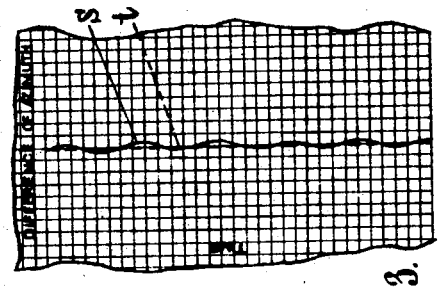
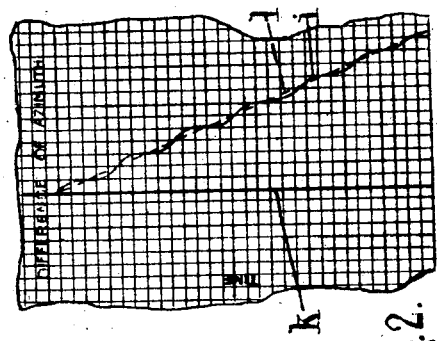
S. G. Brown
INVENTOR
By: Marks & Clark
Attys.

Patented June 23, 1931

1,811,300

UNITED STATES PATENT OFFICE

SIDNEY GEORGE BROWN, OF NORTH ACTON, LONDON, ENGLAND

GYROSCOPIC DIRECTIONAL INSTRUMENT

Application filed December 22, 1926, Serial No. 156,487, and in Great Britain February 3, 1926.

The invention relates to gyroscopic directional instruments.

Gyroscopic north-seeking compasses as at present known are subject to an uncorrected source of error inherent in the instrument itself which takes the form of a small deviation on either side of the north point, while similarly in the static type of gyroscopic directional instrument, i. e., the type which has no north-seeking property but maintains any initial azimuthal direction to which it may be set, uncorrected errors likewise exist.

Neither type of instrument, therefore, the north-seeking or static, provides on the ship or other vehicle on which the instrument is mounted an invariable datum line fixed in relation to the earth's surface and consequently in certain cases such as gunnery or the like where a specially high degree of accuracy in azimuth is required, such instruments as at present constructed are inadequate and without means of correction except by checking against the observed bearings of the sun, stars or the like.

The primary object of the present invention is to overcome this difficulty.

With such an object:—

The invention consists in the combination of a north-seeking gyro-compass and a static gyroscopic azimuth-indicating instrument with means operated in accordance with the deflection in azimuth of these instruments respectively for indicating the difference of such deflections, such means preferably including an appropriate element to which such difference is imparted.

It will be seen that the present invention is based on the fundamental principle that by comparison of north seeking and static gyroscopic azimuth-indicating instruments, the actual error of one or both at a given moment may be ascertained and hence an invariable datum line deduced or secured.

In north-seeking gyroscopic compasses, the error alternates in direction about a mean position while in the static gyroscopic instrument, it is cumulative in a given direction.

Referring to the accompanying diagrammatic drawings:—

Figure 1 shows a general arrangement in which the difference in the movements in azimuth of a gyro-compass and a static gyro are recorded on a chart, Figure 2 is a view of a normal record so obtained and Figure 3 is a view of the record in which the movements of the static gyro have been corrected.

In carrying the invention into effect according to the preferred form, as shown in Figure 1 a gyro-compass, A, operates a motor, $a$ in accordance with its deflection in azimuth by way of any suitable form of repeater mechanism, not shown in the drawings such as described for example in U. S. Patent No. 1,419,010, June 6, 1922, the motor $a$, in turn driving a screwed spindle, $b'$. Similarly a static gyro, B, operates a second motor, $b$, by a suitable repeater system likewise not shown in the drawings, this motor rotating the screwed spindle, $c$. A gear wheel, $d$, carried by a frame, $e$, slidable along the spindles, $b'$ and $c$, is arranged to gear with both of these spindles.

The two instruments, A and B, are mounted on the ship or other vehicle carrying them their lubber lines oriented similarly or at a given angle.

The whole arrangement is so designed as regards directions of rotation that if the gyro-wheels of the instruments, A and B, are departing from a given datum in the same direction at the same rate the tendency of the one spindle $b'$, to move the wheel $a$, in one direction is precisely counterbalanced by the tendency of the spindle, $c$, to move it in the other direction. In other words the mechanism exercises a differential action on the wheel, $d$, so as to impart thereto the difference in the azimuthal movements of the two gyro-wheels.

Conveniently a pen, $f$, is attached to the frame, $e$, and traces a record of this difference of movement on a chart carried by the rotating drum, $h$.

Since the nature of the errors differ in the two types of gyro-instruments in question as explained above, that of the north-seeking compass being oscillatory about a mean point while that of the static gyro is continuous in a given direction, the record will normally consist, as shown in Figure 2, of an undulatory line, $i$, the general direction of which is inclined to a datum line, $k$, parallel to the direction of motion of the paper on which the record is made. Having obtained such an undulatory line it is easy to insert with a ruler, for example, a straight line, $l$, in a mean position which then gives the rate of movement in azimuth of the static gyro, while the undulations on each side thereof show the departure of the gyro-compass at any moment from the true north.

Having by such means obtained the rate of wander of the static instrument, a correction may be introduced by any suitable means.

Alternatively, the displacement of the wheel, $d$, from its mid position is utilized to operate a suitable device which will impose a couple about the horizontal axis on which the gyro casing of the static instrument is pivoted and so cause the necessary precession in azimuth to correct its wander.

The automatic means by which this correcting couple is applied may take many different forms.

According to one example, a magnet or magnets, $m$, is or are mounted on the end of the knife-edge rigid with the gyro-casing and carried by the vertical ring, $n$, of the instrument. In juxtaposition to the magnet one on each side thereof a pair of coils $o, o$, are mounted on the vertical ring of the gyro-mounting, these two coils being connected as shown to a high resistance wire, $r$, along which moves a contact, $r'$, carried by any suitable part of the frame, $e$, the whole arrangement thus forming a kind of potentiometer by means of which a slight bias is imparted to the static gyro so that its wander is counter-acted.

A typical form of record so obtained is shown in Figure 3, in which the undulations, $s$, are disposed about a mean line, $t$, parallel to the direction of motion of the chart.

By virtue of the present invention, the effect of the motion of the ship or other vehicle on which the instruments are mounted is eliminated so that each may afford, as it were, a datum from which the movements of the other may be observed, controlled or checked.

So long as a north-seeking and static gyroscope are combined as indicated above, the use of mechanism for indicating the difference of their azimuthal movements, though preferable, is not esesential, all the requisite data being present for determining an invariable datum line of known position from the readings of the two instruments and subsequent correlation thereof by graphing or calculation.

Having now described my invention, what I claim as new and desire to secure by Letters Patent is:—

1. The combination of a north-seeking gyro-compass, an independently acting static gyroscopic azimuth-indicating instrument, and means operated by these instruments for indicating the algebraic sum of their azimuthal deflection.

2. The combination of a north-seeking gyro-compass, an independently acting static gyroscopic azimuth-indicating instrument and mechanism associated with each of said gyroscopic instruments, responsive to their respective azimuthal deflections and including a common element whose movement is determined by said deflections and is proportional to their algebraic sum.

3. The combination of a north-seeking gyro-compass, an independently acting static gyroscopic azimuth-indicating instrument, two elements respectively operatively associated with said gyroscopic instruments and responsive to their azimuthal deflections, a third element, and means operatively associated with both first mentioned elements and with said third element and adapted to impart to said third element a movement proportional to the algebraic sum of said deflections.

4. The combination of a north-seeking gyro-compass, an independently acting static gyroscopic azimuth-indicating instrument, screwed spindles operatively associated with said gyroscopic instruments respectively, each spindle being rotationally responsive to azimuthal deflections of its controlling gyro, a frame and a gear wheel rotatably mounted in said frame and engaging both of said screwed spindles, said spindles and said gear wheel being so relatively disposed that movement of said gear wheel and said frame is proportional to the algebraic sum of said deflections.

5. Apparatus as in claim 3, including means for recording on a chart the movement of said third element.

6. The combination of a north-seeking gyro-compass, an independently acting static gyroscopic azimuth-indicating instrument, two elements respectively operatively associated with said gyroscopic instruments and responsive to their azimuthal deflections, a third element, and means operatively associated with both first mentioned elements and with said third element and adapted to impart to said third element a movement proportional to the algebraic sum of said deflections and means controlled by said third element for applying an azimuthal correction to said static instrument.

7. The combination of a north-seeking gyro-compass, an independently acting static gyroscopic azimuth-indicating instrument, two elements respectively operatively associated with said gyroscopic instruments and responsive to their azimuthal deflections, a third element, and means operatively associated with both first mentioned elements and with said third element and adapted to impart to said third element a movement proportional to the algebraic sum of said deflections and means controlled by said third element for applying a couple about the horizontal axis on which the gyro casing of said static instrument is pivoted to cause a corrective precession in azimuth.

8. Apparatus as in claim 6, wherein said corrective means comprises two coils mounted on the vertical ring wherein the gyro casing of said static instrument is pivoted, means for supplying current to said coils, means for varying said current in accordance with the movement of said third element and a magnet rigidly associated with said gyro casing and in operative relation with said coils.

In testimony whereof I have signed my name to this specification.

SIDNEY GEORGE BROWN.